(12) United States Patent
Grieb et al.

(10) Patent No.: US 9,152,134 B2
(45) Date of Patent: Oct. 6, 2015

(54) CLOSED-LOOP CONTROL DEVICE

(71) Applicant: Siemens Aktiengesellschaft, Munich (DE)

(72) Inventors: Herbert Grieb, Malsch (DE); Lena Lohner, Karlsruhe (DE); Bernd-Markus Pfeiffer, Wörth (DE)

(73) Assignee: Siemens Aktiengesellschaft, Munich (DE)

( * ) Notice: Subject to any disclaimer, the term of this patent is extended or adjusted under 35 U.S.C. 154(b) by 508 days.

(21) Appl. No.: 13/646,234

(22) Filed: Oct. 5, 2012

(65) Prior Publication Data

US 2013/0090747 A1 Apr. 11, 2013

(30) Foreign Application Priority Data

Oct. 6, 2011 (EP) ..................................... 11184055

(51) Int. Cl.
*G05B 13/02* (2006.01)

(52) U.S. Cl.
CPC .................................. *G05B 13/0205* (2013.01)

(58) Field of Classification Search
USPC .......................................................... 700/28
See application file for complete search history.

(56) References Cited

U.S. PATENT DOCUMENTS

| | | | |
|---|---|---|---|
| 4,914,564 | A | 4/1990 | Surauer et al. |
| 2006/0190099 | A1 | 8/2006 | Nangoy et al. |
| 2010/0270095 | A1 | 10/2010 | Shono et al. |

FOREIGN PATENT DOCUMENTS

| | | |
|---|---|---|
| CN | 101055465 | 10/2007 |
| DE | 25 28 313 | 5/1976 |
| DE | 36 06 640 | 10/1987 |
| EP | 2 228 491 | 9/2010 |

*Primary Examiner* — Carlos Ortiz Rodriguez
(74) *Attorney, Agent, or Firm* — Cozen O'Connor

(57) ABSTRACT

A closed-loop control device for a process, in which a dead band element is connected upstream of a linear dynamic controller to reduce actuating interventions in the steady control state. If a control deviation (e) of the control loop exceeds a first threshold value (s1), then the dead band element is automatically deactivated, where a control deviation (e1) passed via the dead band element is uninfluenced by a set dead band in the inactive state. If the control deviation (e) then undershoots a second threshold value that is less than the first threshold value, then the dead band element is automatically re-activated. This reduces the energy consumption and wear of an actuator and improves the control behavior with regard to steady-state accuracy and the control behavior of the control loop.

11 Claims, 4 Drawing Sheets

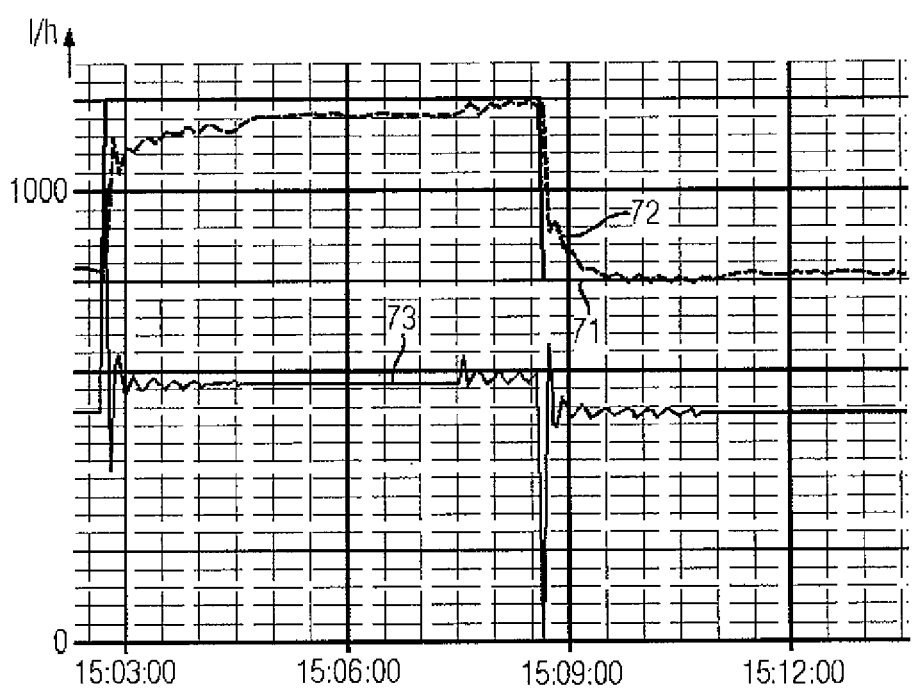

CLOSED-LOOP CONTROL DEVICE

BACKGROUND OF THE INVENTION

1. Field of the Invention

The invention relates to a closed-loop control device for a process in which a dead band element is connected upstream of a linear dynamic controller.

2. Description of the Related Art

The function manual "Prozessleitsystem PCS 7, PCS 7 Advanced Process Library V71", March/2009, discloses PID controllers, which may also be referred to as P, PI or PD controllers depending on the configuration, or model-predictive controllers, which are referred to as ModPreCon there, for example, as linear dynamic controllers that can have a dead band element connected upstream of them when used in a closed-loop control device. The transfer function of a dead band element described there is illustrated in FIG. 2. With a dead band element connected upstream, a control difference that is passed to the controller is formed from an effective desired value SP and a process value PV and is available to the controller at the output ER. In order to suppress disturbances in the steady state or to suppress unavoidable measurement noise, the dead band can be activated and the lower band limit −D (dead band) can be parameterized together with the upper band limit D. If D is set to 0, then the dead band is deactivated but, if D is not equal to 0, then the dead band is activated. The dead band is parameterized by the user and is constant during operation. Here, the dead band is ideally parameterized such that the likelihood of actuating interventions is low if the controlled variable has stabilized inside the dead band. This requires a sensible selection of the width of the dead band.

The width of the dead band primarily depends on the control precision desired by the process, i.e., on the maximum permissible remaining control deviations and possibly, for example, if a switching actuator is used, on the change in the controlled variable with the minimum possible change in the manipulated variable. With regard to minimizing actuating interventions, the following setting rules help in this case to select the dead band to be so wide that variance in the controlled variable, which is unavoidable on account of measurement noise or quantization noise for example, does not result in frequent actuating movements.

Firstly, assuming a normal statistical distribution of the values of the controlled variable around the desired value, two to three times the standard deviation of the controlled variable in the steady state is used as the width of the dead band. If the closed-loop control device is provided with a monitoring module for determining characteristic variables for the control behavior, which is also referred to as control performance management (CPM) or ConPerMon in the function manual mentioned at the outset, the standard deviation of the actual value, calculated in the monitoring module, can be used to calculate the dead band width.

Secondly, if the controlled variable is changed only gradually by quantizing the manipulated variable, for example, on account of pulse width modulation with a defined minimum pulse duration, on account of a step controller with a defined minimum step size or in the case of an electropneumatic position controller with static friction in the stuffing box of the pneumatic drive, then the width of the dead band depends on the manipulated variable quantization that should be multiplied by the respective process gain. For example, in the case of temperature control with manipulated variable quantification of 5% and a process gain of 1.5° C./%, only temperatures in a grid of

5%·1.5° C./%=7.5° C.

can be accurately achieved. The dead band must then be selected to be so wide that at least one grid point, at which the process can stay in a steady state, falls in the dead band. The limit D of the dead band should be set to be greater than approximately 3.8° C. in this example.

Although a certain reduction in the actuating interventions is already achieved with a dead band of constant width, some disadvantages must be accepted.

Firstly, control deviations that are smaller than the dead band are ignored by the controller, i.e., the controller does not correct these deviations even if the controller could do so without an upstream dead band. Therefore, steady states of the actual value of the controlled variable may be established, the temporal mean value of which deviates considerably from the desired value.

Secondly, if steady states are established in the edge regions of the dead band, then a control intervention may result again and again even with the slightest disturbances. This is because, after a disturbance event that results in the dead band being left, the controller returns the actual value of the controlled variable only to the respective edge of the dead band, which may result in new actuating interventions in the event of further disturbances. This increases the wear and energy consumption of the actuator.

Thirdly, large dead bands particularly have an adverse effect on the control behavior of the control loop in the event of sudden desired value changes. The reason for this is that the controller first of all "stops work", for example, in the rise phase of a positive step response when the control difference enters the dead band. This may result in a creeping stabilization process or in the controller only becoming active again when the actual value exceeds the upper limit of the dead band on account of an overshoot.

A dead band element connected upstream of the controller in a closed-loop control device can thus contribute, as is known, to reducing actuator movements and thus the energy consumption and the wear of the actuator. This applies, in particular, to mechanical actuators, such as valves and pumps. Furthermore, a dead band element is able to avoid sustained oscillations as an operating movement of an actuator, which are caused by the quantization of the actuating interventions, in the control loop.

However, use of an upstream dead band element has hitherto usually resulted in impairment of the control quality because the exact desired value is achieved only with an offset dependent on the dead band width and not by the mean value of the controlled variable, as when the dead band element is omitted. The offset of the controlled variable with respect to the exact desired value also results in the dead band actually selected for the purpose of reducing actuating interventions being left more frequently because the dead band is symmetrical around the desired value and not around the achieved actual value of the controlled variable. Upon leaving the dead band, the controller must again intervene to return the actual value to the region of the dead band again, with the result that the abovementioned advantages of a dead band can be achieved only to a lesser extent.

These problems result in dead band elements often being connected upstream of linear dynamic controllers only in those cases in which they are absolutely necessary and usually not in cases in which only the wear and energy consumption of a process system, in which the closed-loop control device is used, are intended to be reduced.

SUMMARY OF THE INVENTION

It is therefore an object of the invention to provide a closed-loop control device for a process, in which a dead band element is connected upstream of a controller and which can be used to further improve the reduction of actuating interventions and to achieve a more favorable control behavior, particularly with regard to the steady-state accuracy.

This and other objects and advantages are achieved in accordance with the invention by providing a closed-loop control device, a control method, and a corresponding computer program and a computer program product in which the dead band element is temporarily deactivated when relatively large control deviations occur, i.e., irrespective of whether these deviations have been caused by a sudden desired value change or by a disturbance event, so that the controlled variable of the process controlled by the closed-loop control device on statistical average stabilizes in the center of the dead band.

The dead band element can be re-activated from a deactivated state only when the control deviation undershoots a second threshold value that is less than the first threshold value at which deactivation was effected. As a result, the likelihood of the control difference remaining inside the dead band for a long time and thus no further actuating interventions becoming necessary for a long time is advantageously increased. This particularly results in reduced wear and lower energy consumption of the actuator used in the control loop.

In addition, the above-described disadvantages of a dead band element, which cannot be automatically deactivated, with respect to the control behavior in the event of sudden desired value changes, for example, creeping behavior or overshoots during the stabilization process, are considerably reduced. The acceptance for the use of dead band elements with users is thus increased because the previous adverse effects on the control quality are largely avoided. The energy savings that can be achieved by the inventive closed-loop control device on account of reduced actuating interventions come in useful in considerably more applications. This applies, in particular, to control loops in which mechanical actuators, such as valves or pumps are used. This is because, in valves, the energy consumption is directly dependent on the movement distances covered, i.e., on the time integral of the travel. Especially in electropneumatically operated control valves, the consumption of compressed air is proportional to the movement distances covered counter to a spring force when a single-acting pneumatic drive is involved. In the case of centrifugal pumps, energy for accelerating or braking the rotor and the concomitantly moved medium is necessary for each speed change, which energy is respectively consumed if there is no frequency converter with recovery of the braking energy. In the case of temperature control loops having so-called split-range control for heating or cooling a process medium based on the respectively prevailing control deviation, it is important to avoid oscillations of the actuating signal that would result in heating and cooling following one another in quick succession, and would thus waste energy. The reduction in sustained oscillations that is achieved with the new closed-loop control device contributes to reducing the energy consumption in a particularly advantageous manner here.

In one particularly advantageous embodiment of the invention, the first threshold value, upon the exceeding of which the dead band element can be automatically deactivated, is set to be equal to the dead band limit. As a result, it is possible to dispense with inputting an additional parameter when starting up the closed-loop control device, and the start-up complexity can thus be reduced. In this context, it should be pointed out that the terms "dead band limit" and "dead band width" are often used as synonyms because the magnitude of the control deviation is used to assess whether the control deviation is within the dead band.

In another advantageous embodiment, the second threshold value, upon the undershooting of which the dead band element is changed to the active state again, is selected to be 0.15 times the dead band width that has been set. This parameter can therefore be automatically calculated based on the dead band width that has been set. As a result, there is also no need for a separate input by an operator for this purpose. This is because it has been shown in practice that values of between 0.1 and 0.2 times the dead band width provide very good results with respect to the steady-state accuracy and the reduction of actuating interventions.

After the control deviation has undershot the second threshold value, it is advantageously possible to wait for a certain time and to then again check for the compliance with this limit by the control deviation to ensure that the process has already stabilized at the operating point when the dead band element is re-activated. This advantageously results in the actual value of the controlled variable having stabilized virtually in the center of the dead band. In addition, the likelihood of the actual value remaining inside the dead band for a long time without further actuating interventions is increased.

In order to bring the mean value of the controlled variable as close to the desired value as possible, in the event of controlled variable fluctuations, the profile of the manipulated variable can be additionally taken into consideration in the closed-loop control device. For this purpose, a manipulated variable that corresponds to a mean value of the manipulated variable output in a time window in the deactivated state of the dead band element is output after the dead band element has been re-activated. If the second threshold value is undershot and the dead band element is re-activated, the manipulated variable currently calculated by the controller is thus not used for the future time while remaining in the dead band, but rather the mean value of the manipulated variable output in the steady state. The manipulated variable typically performs a small operating movement during previous operation with the dead band element deactivated. As a result, an instantaneous value of the manipulated variable that is rather randomly singled out when changing to the activated state would namely generally be less suitable for keeping the controlled variable in the vicinity of the desired value than the mean value of the manipulated variable output in the steady state. The controlled variable thus advantageously stabilizes in the center rather than at the edges of the dead band. Unnecessary shifts of the mean value of the controlled variable from the desired value and thus a poor steady-state control quality are thus avoided.

If the closed-loop control device is provided with a monitoring module for control performance monitoring (CPM), as is used in the PCS 7 process control system, for example, different parameters of the inventive closed-loop control device can be derived from characteristic variables that are calculated in the monitoring module anyway. This has the advantage that the parameters are determined in a particularly simple and reliable manner because it is possible to resort to tried and tested parts of the monitoring module. The standard deviation of the controlled variable at the operating point can thus be used to dimension the dead band width. Furthermore, a sliding time window is used in the monitoring module and can be used as a reference point for the duration of stabilization processes, i.e., for the time for which the process is intended to wait before the dead band is reactivated. In addition, the mean value of the manipulated variable is calculated in the sliding time window in the known monitoring module CPM and can be adopted as the value of the manipulated variable when reactivating the dead band element. In order to output this manipulated variable, the controller is changed to tracking operation with this manipulated variable value for one scanning cycle and the smooth manual/automatic changeover that is known in controllers of the PCS7 process control system is then used.

A method for controlling a process, which can be carried out using the closed-loop control device, is preferably implemented using software or a combination of software/hardware, with the result that the invention also relates to a computer program having program code instructions that can be executed by a computer and are intended to implement the method. In this context, the invention also relates to a computer program product, i.e., a data carrier or a storage medium, having such a computer program that can be executed by a computer. Such a computer program is preferably part of an automation device used to implement the closed-loop control device or is held in a memory of the automation device or can be loaded into this memory, with the result that, during operation of the automation device, the automation device automatically performs the method for controlling the process.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention as well as refinements and advantages are explained in more detail below using the drawings which illustrate an exemplary embodiment of the invention and in which:

FIGS. 4 to 7 show timing diagrams for illustrating the control behavior.

DETAILED DESCRIPTION OF THE PREFERRED EMBODIMENTS

Figure 1:
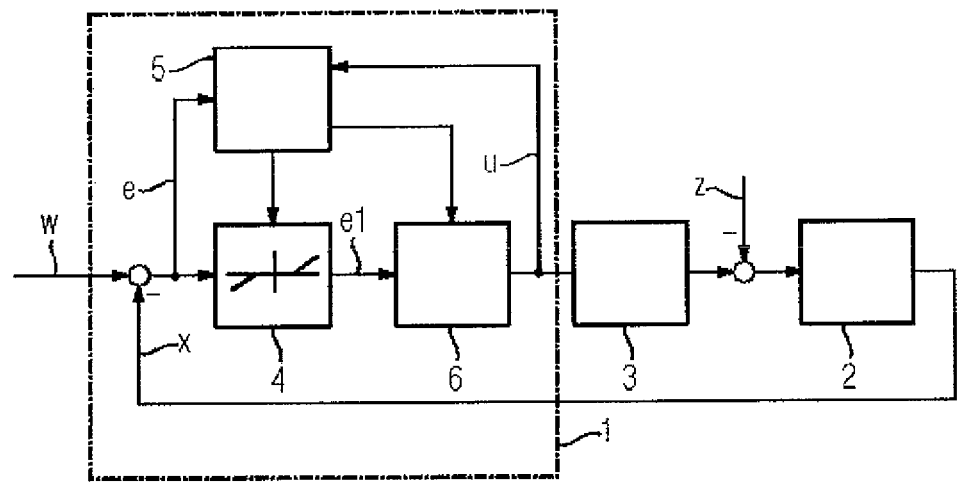
FIG. 1 is a schematic block diagram illustrating a control loop.
Figure 2:
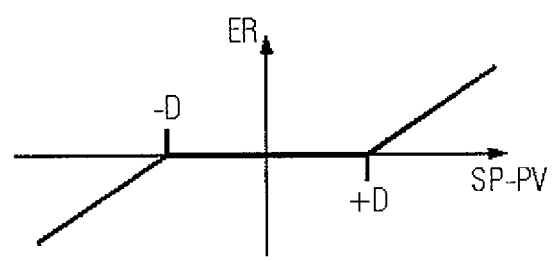
FIG. 2 is a graphical plot transfer of a function of a conventional dead band element.

FIG. 1 shows a block diagram having different function blocks from which it is possible to construct a closed-loop control device 1 which acts on a process 2 with the aid of an actuator 3. The actuator 3 may be a valve, for example, and the process 2 may be a tube in which the mass flow rate is intended to be set as the controlled variable x after a desired value w has been specified. The exact setting of the desired value w is made more difficult by disturbances z which may be pressure fluctuations in the tube 2, for example. A control deviation e calculated as the difference between the desired value w and values of the controlled variable x is passed to a dead band element 4 and an open-loop control device 5 in the closed-loop control device 1. The open-loop control device 5 can be used to automatically activate and deactivate the dead band element 4. In the deactivated state, the dead band element 4 provides an output variable e1 that corresponds to the control deviation e. However, in the activated state, the control deviation e is passed, in a corrected form in accordance with the transfer function shown in FIG. 2, as an output variable e1 to a downstream controller 6, for example, a PID controller, which generates a manipulated variable u for the actuator 3. A monitoring module which, like the known control performance monitoring, determines different characteristic variables for the control behavior is integrated in the open-loop control device 5. Different parameters of the closed-loop control device are determined automatically using these characteristic variables or by correction using factors to be manually input. That is a first threshold value, upon the exceeding of which the dead band element 4 can be automatically deactivated by the open-loop control device 5, a second threshold value, upon the undershooting of which the dead band element 4 can be automatically re-activated, the width D (FIG. 2) of the dead band of the dead band element 4, a period for which the process waits before re-activating the dead band element 4 after the control deviation e has undershot the second threshold value for the first time in the deactivated state of the dead band element 4, and the width of a time window over which the mean value of the manipulated variable u is taken into account to determine a value of the manipulated variable u to be output by the controller 6 when the dead band element 4 is re-activated. The closed-loop control device 1 may be implemented, for example, by a controller functional module in accordance with the invention that is implemented based on the known PID controller or the known model-predictive controller of the PCS 7 process control system substantially by expansion with the new open-loop control device 5.

Figure 3:
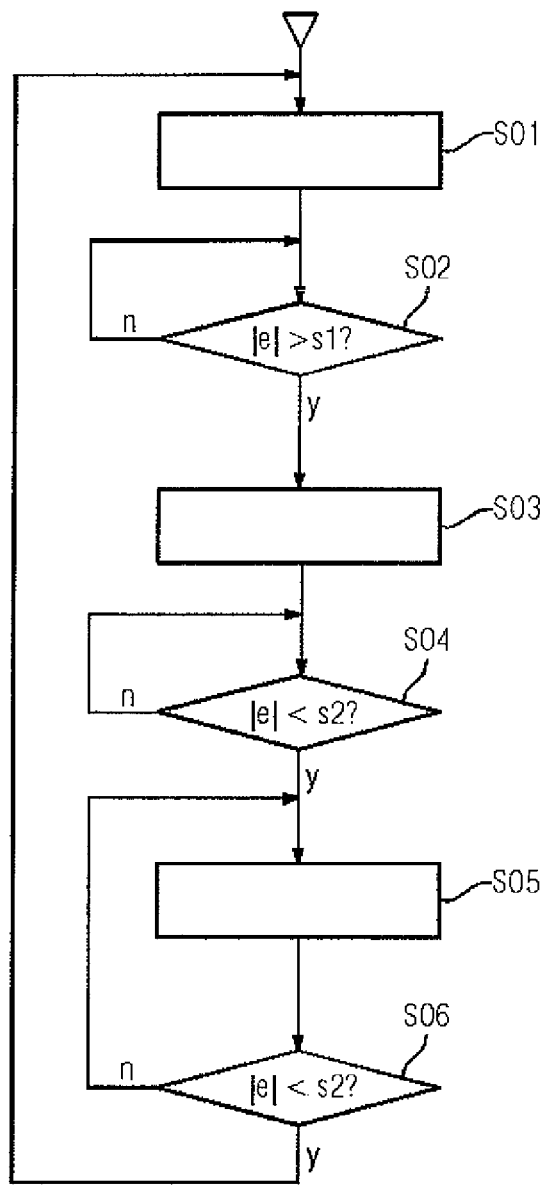
FIG. 3 is a flowchart having the state transitions of the dead band elements in accordance with the invention.

The method for controlling a process in accordance with the invention is explained in more detail below with the aid of a flowchart using FIG. 3. In the exemplary embodiment shown, the method begins with a step S01 in which the dead band element is changed to the active state. (In another exemplary embodiment, it should be understood that the sequence could be entered before deactivation of the dead band element, which occurs later here). After the dead band element has been activated, the control deviation e is checked for the exceeding of the first threshold value s1 in a query S02. As long as the threshold s1 is not exceeded, the dead band element remains in the activated state. This branch is marked with an "n". In contrast, if the magnitude of the control deviation e leaves the dead band, the sequence changes to a step S03 according to a branch marked with "y" and the dead band element is changed to the inactive state. In the inactive state, if no dead band element 4 is connected upstream of the controller 6 (FIG. 1), the uncorrected control deviation e is passed to the controller input to achieve an improved transient response and better steady-state accuracy. If the controlled variable is brought very close to the desired value again and the control deviation e thus undershoots a second threshold value s2, this is determined by a query S04 and the sequence changes to an action S05 in which the sequence waits for a particular time which corresponds to the duration of a stabilization process of the control loop. In a query S06 which then follows, a check is again performed to determine whether the control deviation e is less than the second threshold value s2, i.e., whether the process has stabilized at the operating point. If this is the case, the sequence returns to the beginning of the method and the dead band element is re-activated in step S01. If the process has not yet stabilized, the sequence changes to step S05 again and waits for the conclusion of a stabilization process.

Figure 4:
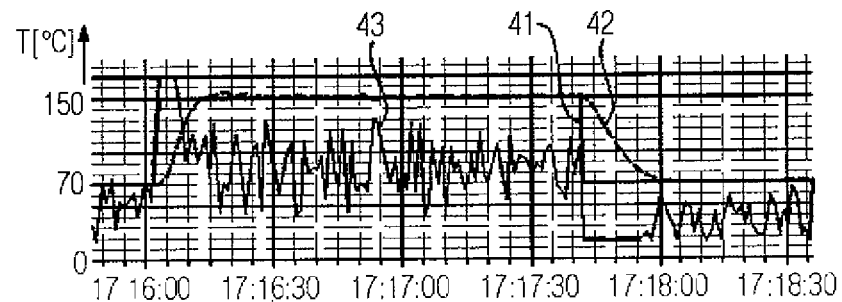
Figure 5:
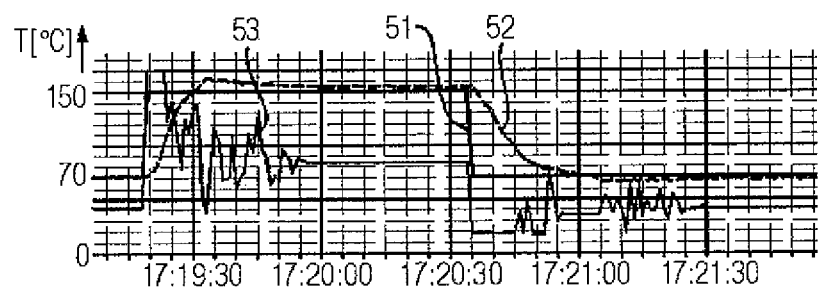
Figure 6:
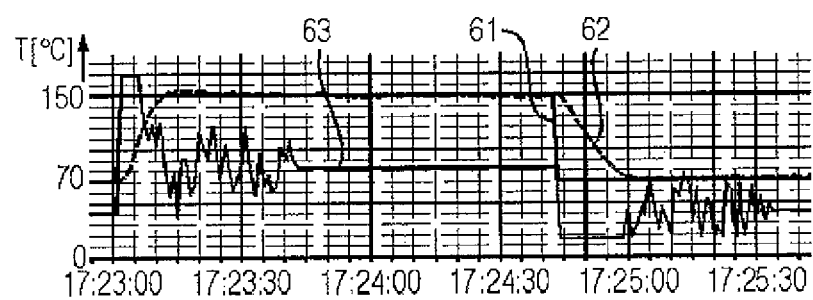

The advantageous effects of the different measures are first of all intended to be illustrated using the timing diagrams in FIGS. 4 to 6. These diagrams show different simulation results for a temperature controlled system with a process model $$g(s) = \frac{3}{(15s+1)(2s+1)}$$

and a PID controller with the following parameters: gain=5, TI=7, TD=2. A colored noise signal acts on the actual value of the controlled variable, which noise signal has the standard deviation of 0.5° and is generated from white noise with the aid of a form filter with the transfer function $$f(s) = \frac{10}{100s+1}$$

The dead band of the dead band element has a generously selected width of D=5° C. to make the described effects clearly visible. In the diagrams, the respective time is plotted on the abscissa, and the temperature T in ° C. is plotted on the ordinate. FIGS. 4 to 6 depict profiles 41, 51 and 61 of the desired value, profiles 42, 52 and 62 of the actual value of the controlled variable and profiles 43, 53 and 63 of the manipulated variable. The simulated sudden desired value changes are between the temperatures of 70° C. and 150° C. Immediately after the sudden desired value changes, the profiles 43, 53 and 63 of the manipulated variable briefly reach a predefined manipulated variable limit.

FIG. 4 shows the result of a simulation in which the dead band element is continuously deactivated, i.e., control without a dead band. The desired value is effectively reached by the actual value on average, but many actuating interventions are required on account of the disturbance, which is apparent from clear swings in the profile 43 of the manipulated variable. As a result of the permanent actuator movements, a lot of operating energy for the actuator is consumed even in the steady state. In addition, the wear on the actuator is considerable on account of the continuous actuating interventions.

In contrast, the simulation results of control with a constant dead band, i.e., a closed-loop control device in which the dead band element is continuously changed to the active state, which are illustrated in FIG. 5, show a remaining difference between the desired value and the actual value even in the steady state, but there are no longer any changes in the manipulated variable for this as of a particular state that corresponds to the entry of the control deviation to the dead band after the stabilization process. The stabilization process itself lasts somewhat longer than in the case of control without a dead band explained using FIG. 4. The manipulated variable thus settles in the steady state, but the control behavior is poor and the actual value of the controlled variable plateaus at the edge of the dead band rather than at the desired value.

If the dead band element is now deactivated during the sudden desired value change, as in the simulation results shown in FIG. 6, the actual value quickly follows the controlled variable and precisely follows the profile of the desired value, and actuating interventions are virtually no longer required in the steady state. Energy consumption and wear of the actuator are thus considerably lower. As is clearly apparent in FIG. 6, the control exhibits a good control behavior and the actual value of the controlled variable is adjusted to close to the desired value in the steady state.

It becomes clear from FIGS. 4 to 6 that the new closed-loop control device in accordance with the invention combines both the advantages of control without a dead band element and control with a continuously activated dead band element without being encumbered with the disadvantages thereof.

The closed-loop control device in accordance with the invention was likewise successfully tested on an actual system model with a PID controller and a model-predictive controller. In this case, use was made of a PID flow controller with a dead band of 30 l/h at an operating point of 1200 l/h, and a dead band of 3% based on the total filling level of 100% was used in the first channel of the multichannel model-predictive controller which has a 3×3 structure and controls the reactor filling level and the two inlets. In FIG. 7, the time is plotted on the abscissa, and the flow rate in l/h is plotted on the ordinate. A profile 71 of the desired value shows a sudden upward change of 200 l/h close to the beginning of the recording period and a sudden downward change of the same magnitude approximately in the center. Profiles 72 and 73 for the actual value of the controlled variable and manipulated variable are also depicted. The dead band element that is connected upstream of the flow controller is temporarily deactivated shortly before the second sudden downward desired value change. With the first sudden upward desired value change with the dead band element in the active state, a creeping control behavior and a remaining control deviation, which is clearly visible after the stabilization process, are exhibited. The control behavior is improved and the remaining control deviation is reduced by temporarily deactivating the dead band element in the event of a sudden downward change. The considerable improvement in the control quality by temporarily deactivating the dead band element with the simultaneous reduction in the actuating interventions is thus also confirmed in the validation in an actual system.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A closed-loop control device for a process, comprising:
    a linear dynamic controller;
    a dead band element connected upstream of the linear dynamic controller to reduce actuating interventions during steady state control; and
    an open-loop control device configured to automatically deactivate the dead band element if a control deviation of a control loop exceeds a predefined or predefinable first threshold value, a control deviation passed via the dead band element being uninfluenced by a set dead band in a deactivated state, and configured to automatically reactivate the dead band element if the control deviation undershoots a predefined or predefinable second threshold value which is less than the first threshold value;

wherein at least one of:

(i) a period after which the dead band element is reactivateable when the second threshold value is exceeded being predetermined based on a time window set in a monitoring module and is characteristic of a duration of stabilization processes; and (ii) a mean value of a manipulated variable last output in a time window in an inactive state of the dead band element corresponding to the mean value of the manipulated variable calculated in the monitoring module.

2. The closed-loop control device as claimed in claim 1, wherein the first threshold value is equal to a bandwidth of the set dead band.

3. The closed-loop control device as claimed in claim 2, wherein the second threshold value is equal to 0.1 to 0.2 times the bandwidth of the set dead band.

4. The closed-loop control device as claimed in claim 3, wherein the closed-loop control device is further configured to output a manipulated variable corresponding to a mean value of the manipulated variable last output in a time window in an inactive state of the dead band element after the dead band element has been reactivated.

5. The closed-loop control device as claimed in claim 2, wherein the closed-loop control device is further configured such that, in the deactivated state of the dead band element after the second threshold value has been exceeded by the control deviation, a predefined or predefinable period wait period occurs and, only after said predefined or predefinable period wait period expires, is the dead band element then automatically reactivateable if the control deviation is less than the second threshold value.

6. The closed-loop control device as claimed in claim 1, wherein the second threshold value is equal to 0.1 to 0.2 times a bandwidth of the set dead band.

7. The closed-loop control device as claimed in claim 6, wherein the closed-loop control device is further configured such that, in the deactivated state of the dead band element after the second threshold value has been exceeded by the control deviation, a predefined or predefinable period wait period occurs and only after said predefined or predefinable period wait period expires, is the dead band element then automatically reactivateable if the control deviation is less than the second threshold value.

8. The closed-loop control device as claimed in claim 1, wherein the closed-loop control device is further configured such that, in the deactivated state of the dead band element after the second threshold value has been exceeded by the control deviation, a predefined or predefinable period wait period of the process occurs and, only after said predefined or predefinable period wait period expires, is the dead band element then automatically reactivateable if the control deviation is less than the second threshold value.

9. The closed-loop control device as claimed in claim 1, further comprising:

a monitoring module for determining a plurality of characteristic variables for the control behavior;

wherein at least one parameter of the closed-loop control device is predetermined using at least one characteristic variable of the plurality of characteristic variables and a bandwidth of the set dead band being predetermined, as the at least one parameter, based on a standard deviation of a controlled variable calculated by the monitoring module.

10. A method for controlling a process, the method comprising the steps of:

connecting a dead band element of a linear dynamic controller to reduce actuating interventions in a steady control state;

automatically deactivating the dead band element if a control deviation of a control loop exceeds a predefined or predefinable first threshold value, a control deviation passed via the dead band element being uninfluenced by a set dead band in the deactivated state; and automatically reactivating the dead band element if the control deviation undershoots a predefined or predefinable second threshold value which is less than the first threshold value;

wherein at least one of:

(i) a period after which the dead band element is reactivateable when the second threshold value is exceeded being predetermined based on a time window set in a monitoring module and is characteristic of a duration of stabilization processes; and (ii) a mean value of a manipulated variable last output in a time window in an inactive state of the dead band element corresponding to the mean value of the manipulated variable calculated in the monitoring module.

11. A non-transitory computer program product encoded with a computer program executed by a computer that causes control of a process, the computer program comprising:

program code instructions for connecting a dead band element of a linear dynamic controller to reduce actuating interventions in a steady control state;

program code instructions for automatically deactivating the dead band element if a control deviation of a control loop exceeds a predefined or predefinable first threshold value, a control deviation passed via the dead band element being uninfluenced by a set dead band in the deactivated state; and program code instructions for automatically reactivating the dead band element if the control deviation undershoots a predefined or predefinable second threshold value which is less than the first threshold value;

wherein at least one of:

(i) a period after which the dead band element is reactivateable when the second threshold value is exceeded being predetermined based on a time window set in a monitoring module and is characteristic of a duration of stabilization processes; and (ii) a mean value of a manipulated variable last output in a time window in an inactive state of the dead band element corresponding to the mean value of the manipulated variable calculated in the monitoring module.

* * * * *